Aug. 30, 1927.
G. W. KEPLER
SCALE
Filed April 27, 1920     2 Sheets-Sheet 1
1,640,836
Fig.1,
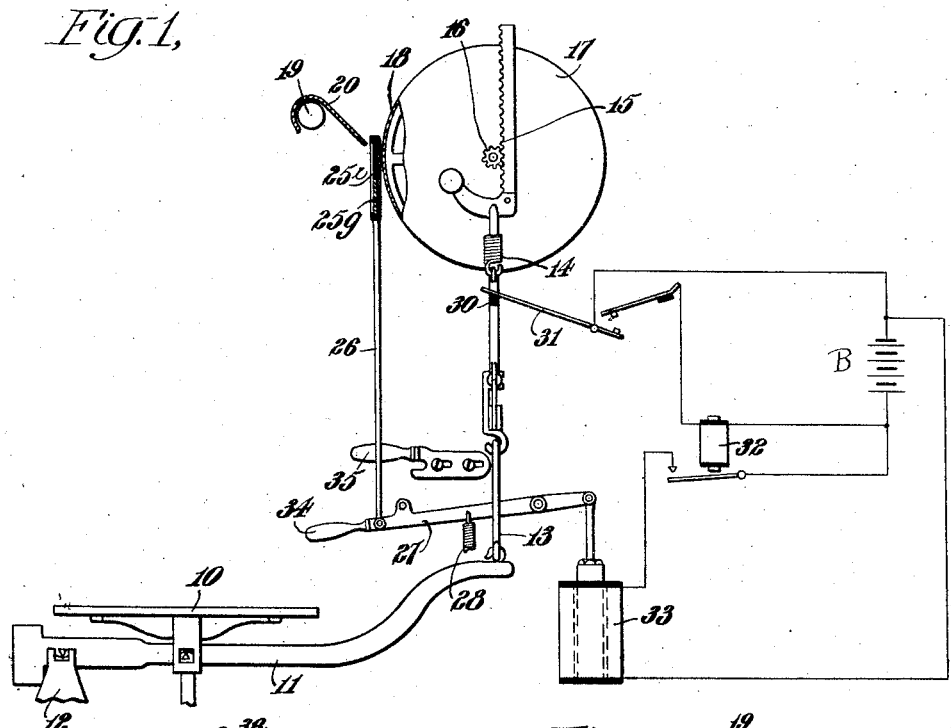
Fig.6,
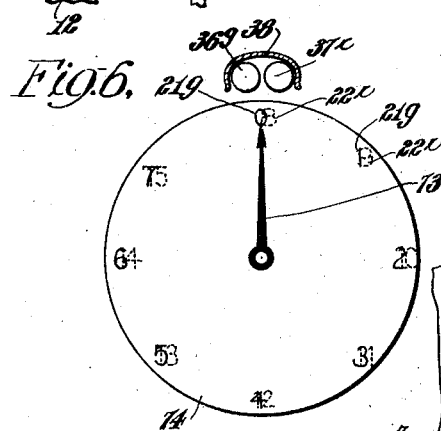
Fig.4,
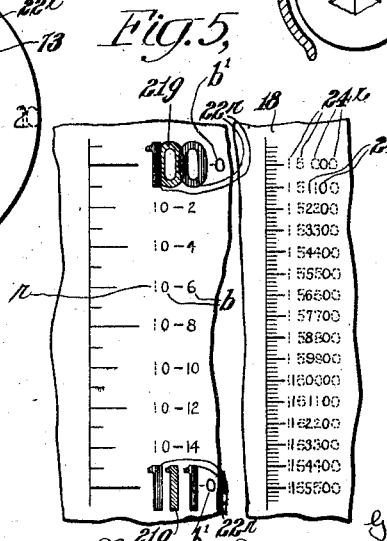
Fig.5,
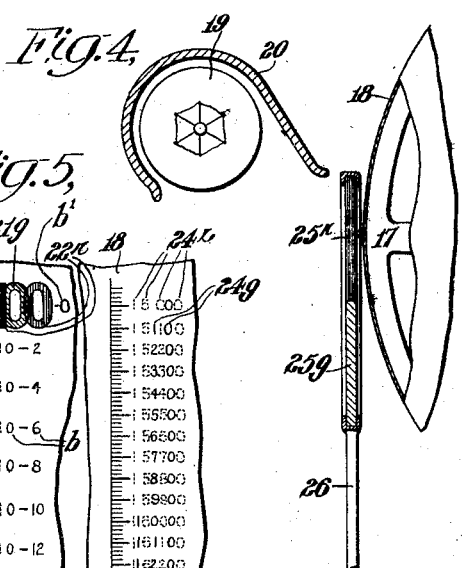
Inventor
George W Kepler
By his Attorneys
Kerr Page Cooper & Hayward Aug. 30, 1927.
G. W. KEPLER
1,640,836
SCALE
Filed April 27, 1920  2 Sheets-Sheet 2
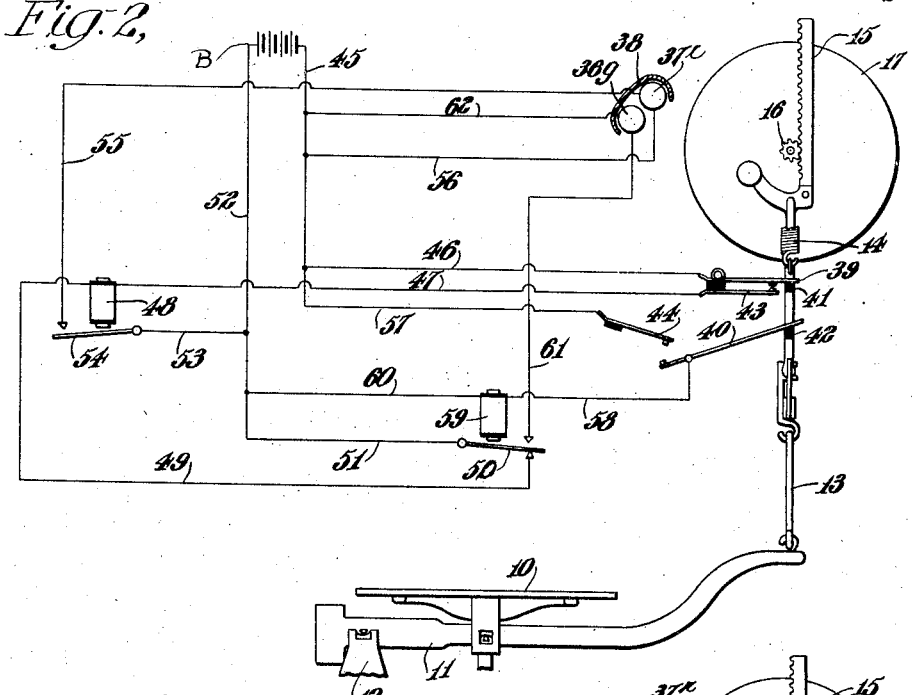
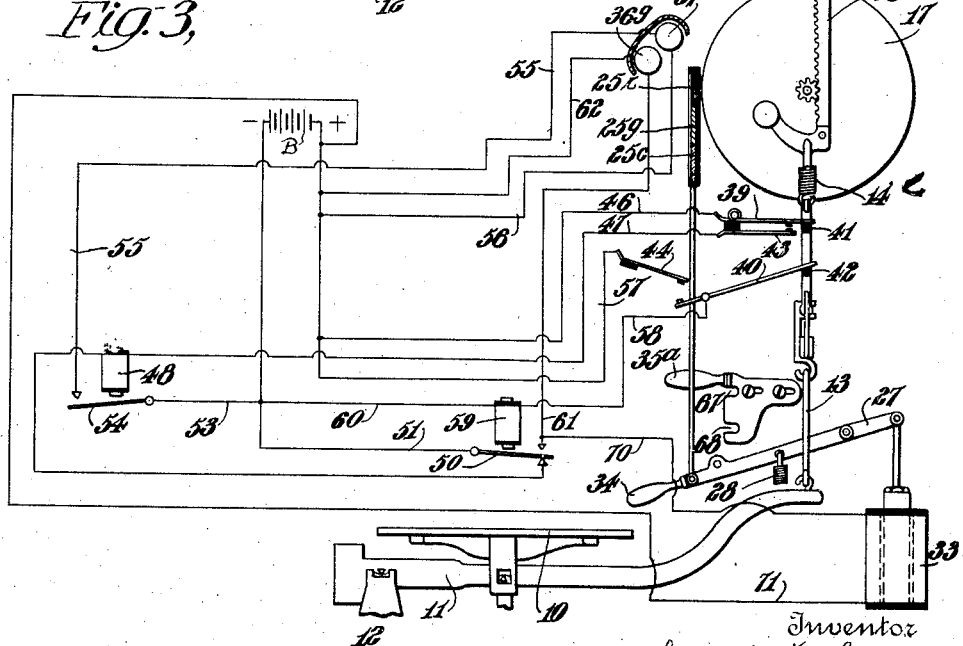
Inventor
George W. Kepler
By his Attorneys
Kerr, Page, Cooper & Hayward Patented Aug. 30, 1927.

1,640,836

UNITED STATES PATENT OFFICE.

GEORGE W. KEPLER, OF DAYTON, OHIO, ASSIGNOR, BY MESNE ASSIGNMENTS, TO DAYTON SCALE COMPANY, OF DAYTON, OHIO, A CORPORATION OF NEW JERSEY.

SCALE.

Application filed April 27, 1920. Serial No. 376,914.

In weighing scales, particularly those of the so-called computing type, regulations have been laid down by various bureaus of weights and measures proscribing the clear interval between the indicating lines. That is to say, on a 30 lb. chart with price capacity values of 60 cents a pound the graduations are as close together as is possible to give a direct reading from the graduated lines of one cent weight value intervals and with charts having higher price values per pound to obtain cent values the regulations permit the operator to estimate by reading between the lines which indicate two-cent values. These restrictions as to clear interval have precluded the use of scales having a high weighing capacity for high commodity prices. For example, if the commodities to be weighed are valued at $1.50 a pound, the usual limit of weighing capacity which can be directly indicated on the chart is about 10 pounds, if the proper clear interval is retained and cent intervales are indicated. While it would seem that greater clear intervals could be obtained by increasing the chart diameter this has been found impracticable in practice because larger charts necessitate larger drum and this increases the weight to be moved by the scale to such an extent as to cause errors in drum displacement, due to the inertia and friction of the relatively heavy parts.

The present invention has for its object the increasing of the indicating capacity of a scale. When incorporated in a scale of the drum type having a computing chart on its periphery the present invention provides means for indicating a given range of weights and prices for one revolution of the drum and for indicating a second range of weights and prices for a second revolution of the drum and the arrangement is such that both readings are obtained from numerals which may be substantially superimposed and not disposed side by side.

It has heretofore been proposed to have a double set of weight and price numerals disposed side by side and to shift a shutter to obscure one or the other set of characters in accordance with the amount of the load. This construction is shown in the patent to Koene No. 770,810. However, the construction therein shown depends upon a manual displaced counterbalance for the action of the shutter and is not adaptable to an automatically counterbalanced scale as the friction load would be excessive. The structure set forth in the present invention increases the capacity automatically and without imposing such a load as to effect the accuracy of an automatically counterbalanced scale or necessitate the use of a manually set counterbalance in place of the automatic counterbalance.

As an example of one of the advantages of the present invention, a scale of the type now used having a 30 pound chart for 60 cents a pound commodity value, would have 1800 graduations for cent values. With commodity values of $1.50 a pound the capacity of such a scale would be decreased to about 12 pounds, which would give 1800 graduations. Considering that 1800 graduations give the minimum limit of clear interval further weighing capacity could not be obtained without sacrificing commodity value capacity. With my improved invention I utilize a chart so graduated as to show 10 pounds on one revolution and to indicate from 10 to 20 pounds on the second revolution. This would give 1500 graduations per revolution for the price values, thereby giving a greater clear interval than heretofore and with a greater weighing capacity at the higher price per pound.

To carry out the invention I utilize the principle which is broadly disclosed in the Berger Patent No. 1,295,842.

While my invention is particularly adapted to computing scales of the drum type its application is also valuable in ordinary weight-indicating scales to increase the indicating capacity thereof and to dispense with doubling weights or capacity weights. The invention may also be applied to various other types of scales.

Other objects and advantages of the present invention will be set forth in the accompanying specification and shown in the drawings in which:

Fig. 1 shows in diagrammatic manner one embodiment of my invention in which a color filter is utilized to change the reading of the indication as the weight indicator completes a revolution.

Fig. 2 shows another embodiment of the invention in which a plurality of lights are employed emitting rays of different character which permit the reading of one or the other set of graduations depending upon the load upon the scale.

Fig. 3 shows an embodiment which is a combination of the showing of Figs. 1 and 2 and in which either method of reading may be employed.

Fig. 4 shows an enlarged view of the chart and ray filter.

Fig. 5 shows an enlarged detail view of the weighing and price chart used for the embodiments shown in Figs. 1, 2 and 3.

Fig. 6 shows an application of the invention to the ordinary dial type of weighing scale.

In the drawings 10 is the scale platform and 11 the lever or scale beam which is fulcrumed at 12 and upon which the platform rests. The free end of the lever is connected to a draft rod 13 which through the usual equalizer bar connects with the counterbalancing springs 14 and to the racks 15 which mesh with pinions 16. These pinions turn a drum shaft which rotates a drum 17 carrying a weight and price chart 18 on its periphery. The check and other details are not herein shown as they are similar to those on numerous scales now on the market. Means are provided for electrically illuminating the chart when a load is upon the scale. These means include a lamp 19 and a reflector 20. The means for controlling the circuit to the lamp may be of the form shown in the Bane and Crane Patent No. 937,573, Oct. 19, 1909.

When a load is placed on the scale platform the drum 17 will be turned proportionally to weight. The chart 18 shown in Fig. 5 is provided with a series of numerals $21^s$ designating weights, which numerals are printed in green. These numerals are disposed about the periphery of the chart and their range is from 0 to 10 pounds for one complete revolution of the chart. Substantially superimposed upon these weight numerals are a second set of weight numerals $22^r$ which range from 10 to 20. These weight numerals $22^r$ are printed in red. The graduation lines, to which both sets of numerals apply are preferably printed in black, although these graduation lines could be half red and half green if desired. Each green number bears a predetermined relation to its corresponding red numeral. In each case the red numeral represents a quantity which differs from the green numeral by the weight capacity of the scale or in this case 10 pounds.

For the ounce values disposed between the even pound values I have shown the common figures in black; for example, for a 0 pound, 8 ounce both the 8 and the zero are shown in black and with 10 pounds 8 ounces the 0 and 8 are in black and the prefix 1 is in red as indicated by the reference characters $r$ and $b$ on Fig. 5. The common numerals in the red and green numerals $22^r$ and $21^s$ could be similarly printed if so desired.

Disposed alongside the weight numerals are sets of price numerals $24^s$ and $24^r$ printed in green and red respectively and in each case the red numeral bears a predetermined relation to its corresponding green numeral. Each red numeral differs from its corresponding green numeral by an amount equal to the weight capacity of the scale per revolution times the value capacity per unit of weight or the price capacity per revolution. In the illustrated embodiment for the $1.50 price per pound scale the difference would be 10 times $1.50 or $15.00.

If desired, the common numerals which are jointly used to make the green and red series could be printed in black.

In the Berger patent heretofore referred to it is explained that red characters, if viewed through a green filter or with green light, will appear black and green characters viewed under the same conditions will be invisible. Green characters on the other hand, if viewed through a red filter or with red light appear black and red characters will be invisible. Black characters or lines viewed under either character of light appear black. This principle is employed for bringing into view one set of value and weight numerals and rendering the other set invisible in accordance with the loading of the scale.

In Figs. 1 and 3 a color filter or color screen is provided which has two screens $25^r$ and $25^s$, one being of red transparent glass and the other of green glass. The screen is carried by a rod 26 connected with a lever 27 and normally held so as to retain the red screen in front of the reading line or index of the chart by means of a spring 28. The parts are retained in this position during the weighing of commodities whose weight is between zero and 10 pounds (the one revolution weight capacity of the chart). With these conditions the operator reads the green weight and price values which through the filter appear black or the combined green and black figures which all appear as black. The red characters are now invisible. When a load in excess of 10 pounds is placed upon the scale platform an abutment 30, carried by the rack rod and descending proportionally to the load, reaches a position to permit a pivoted contact 31 normally supported thereby to establish a circuit from battery B through relay 32. This relay is energized just as the scale drum completes one complete revolution. The energization of the relay establishes a main circuit to a solenoid magnet 33 which then draws down lever 27 elevating rod 26 and placing the green screen 25$^g$ in front of the chart at the reading line. The red weight and price numerals 22$^r$ and 24$^r$ now are visible in black and the green numerals 21$^g$ and 24$^g$ are rendered invisible. In a similar manner figures which have part red and part black characters all appear as black. Current continues to flow in the solenoid circuit until the commodity is removed from the platform or until such weight is removed as to permit the drum to rotate reversely past the 10 pound point. At this time the contact 31 is again picked up by the abutment 30 and the relay circuit broken. This breaks the solenoid circuit and the spring then returns the red color screen to position. The action of changing the screens from red to green and back from green to red is entirely automatic and depends upon the loading of the scale. I also provide a handle 34 for operating the lever 27 by hand and a suitable manually actuated catch 35 for retaining the rod 26 in elevated position. These parts may be used should current be interrupted for any reason. The operator would of course have to determine from the chart when the lever should be thrown one way or the other.

In Fig. 2 I employ no color filter and utilize two lights, one marked 36 which is adapted to give out green light and a second marked 37 which gives a red light. A suitable reflector 38 is provided to reflect these light rays of the chart 18. With red illumination the numerals of weight and price corresponding to the weights and prices to be displayed for the first revolution of the drum are visible and with green illumination the second revolution numerals are visible. Black characters will appear black viewed under either character of light. To control the lights I employ two pivoted contact blades 39 and 40 co-operating with abutments 41 and 42 and adapted to establish contact with points 43 and 44. Contact is established between 39 and 43 as soon as a load is placed on the scale and this contact remains closed during the entire weighing operation. Contact 40 is timed to establish contact with 44 directly after one revolution of the drum is completed and this contact will be broken just as soon as the drum has receded back from this one revolution point. Considering a weight of say one pound on the scale the circuit would be as follows: From current source B through wires 45, 46, contacts 39 and 43, wire 47, relay magnet 48, wire 49, relay blade 50, wire 51 and back through wire 52 to the source B. The energization of relay magnet 48 then establishes a circuit traced as follows: From line 52 through wire 53, relay blade 54, wire 55 to red light 37, thence through wire 56 to line 45 and back to source B. The red light remains in circuit for all weights weighed from 0 to 10 pounds. After 10 pounds is reached and exceeded this light is cut out of circuit in the following manner. Current flows from source B through line 45, wire 57, contacts 44, 40, wire 58, relay magnet 59, wire 60, line 52, and back to source B. Then energization of relay magnet 59 draws blade away from the end of wire 49 and thus breaks the circuit to the red light 37. The blade 50 establishes contact with the end of a wire 61 and this establishes a circuit to light the green light 36. This circuit is traced as follows. From source B through wire 62, green light 36, wire 61, relay blade 50, wire 51, 52 and back to source B.

The interruption of the circuit at the contacts 40—44 immediately de-energizes the relay 59 and breaks the circuit to the green light. Concurrently the relay blade 50 falls to lower position and re-establishes the red light circuit.

Fig. 3 shows a form of the invention which embodies both the forms heretofore described. If desired the color filter method of changing the indications can be used in which case the same circuit-controlling means will throw in circuit the solenoid 33 through wires 70 and 71. The lights 36 and 37 would with this application be replaced with uncolored bulbs and would act to illuminate the chart through the color screen. When it is desired to utilize the colored lights the uncolored bulbs would be replaced with green and red bulbs and the color screen would be swung to extreme position by hand to permit a clear opening 25$^c$ to be in alignment with the reading line or index of the chart. The parts would be retained in this position by a manually actuated catch 35$^a$ having two remaining notches 67 and 68. With the upper notch 67 engaged the color filter would be in "clear" position and the second notch 68 would be used for retaining the green color filter before the chart when the parts are operated by hand.

Fig. 6 shows the well known dial type scale having a pointer 73 swinging over a dial 74 having a green series of weight characters 21$^g$ and a red series 22$^r$. One or the other of the series will be rendered visible depending upon the character of illumination provided by lights 36 and 37.

It will be understood that the color characteristics of light may be changed either by the filter means or by the vari-colored lights. Furthermore the identical result would be attained if a white light were arranged to reflect directly upon the numerals and if suitable filter means were provided for altering the color characteristics of the reflected image of the numerals. In the present application when reference is made to altering the color characteristics of light upon the numerals it will be understood that all equivalent methods of changing visibility are included.

It will also be understood that when the combined colored and black numerals are used that the colored numeral is not superimposed upon the black numeral, but disposed to the left, as a prefix numeral. One prefix numeral alone may be used or two numerals of different colors and these numerals may be superimposed or disposed side by side as desired.

In Fig. 5 the intermediate weights are shown with the red prefix numeral 1 (marked $r$). For illustration I have shown small black zeros marked $b'$ opposite the superimposed numerals 11—1 and 10—0. this combination may be used throughout the chart if desired and the colored prefix numerals may be disposed side by side but preferably they are superimposed as shown to save chart space.

It will be understood that while the construction illustrated in Fig. 6 is shown as having a movable hand or index and a stationary chart, the parts may be reversed and the hand held stationary and the chart rotated if desired. It will be understood that in all of the forms of invention illustrated, the chart and index means are relatively displaceable to show the applied loads. This and other like modifications to the particular embodiment shown are to be considered as within the scope of the appended claims.

What I claim is:

1. In a scale having a support for the goods to be weighed, an automatic counterbalance therefor, a relatively displaceable weight indicator and index means, a plurality of sets of weight-indicating numerals upon said weight indicator, said sets each having predetermined coacting numerals registering concurrently with said index means in the various relative positions of the indicator and index means, and means called into action upon a predetermined load being placed upon the platform for changing the visibility of the display of said coacting numerals at the index position from one set to the other.

2. In a scale, in combination, a support for the goods to be weighed, automatic load-counterbalancing means therefor, an index, a weight-indicator having a plurality of sets of indicating numerals, each said set having coacting numerals registering concurrently with said index, and automatic means for rendering said coacting numerals of one or another set visible in accordance with the applied load.

3. In an automatic scale, in combination, a goods support, a weight-indicator having a plurality of sets of indicating numerals, each set having coacting numerals registering concurrently at the reading point, and weight-controlled means for selectively controlling the visibility of said sets of coacting numerals in accordance with the load applied to the goods support.

4. In an automatic scale, in combination, a goods support, a weight-indicator having a plurality of sets of indicating numerals, each set having coacting numerals registering concurrently at the reading point, means for selectively controlling the visibility of said sets of coacting numerals, and weight-controlled means automatically controlled by the applied load being weighed upon the goods support for controlling the said first mentioned means to increase the indicating capacity of the scale when predetermined loads upon the goods support are exceeded.

5. In a scale, in combination, a goods support, a weight-indicator having a plurality of sets of indicating numerals, means for changing the visibility of said sets of numerals to provide alternate visibility of said sets and means operable only upon a predetermined load being placed upon the goods support for controlling said first named means to increase the indicating capacity of the scale.

6. In a scale, in combination, a goods support, a weight-indicator having a plurality of sets of indicating numerals, means for rendering one of said sets invisible and another set visible, and means operable only upon a predetermined load being placed upon the goods support for controlling said first mentioned means to increase the indicating capacity of the scale.

7. In a scale, in combination, a goods support, a weight indicator having a plurality of sets of indicating numerals, and means operable upon a predetermined load being placed upon the goods support for rendering invisible the portion disposed at the reading line of one of the sets of numerals and for rendering the corresponding portion of the other set visible, whereby the indicating capacity of the scale is increased, said means having provisions for causing the portion of the first mentioned set to be visible and the portion of the second mentioned set to be invisible in the event that the load upon the goods support of the scale is decreased beyond a predetermined amount.

8. In a scale, in combination, a weight-indicator having a plurality of sets of indicating numerals, and means called into action automatically only upon predetermined weighing operations including devices for altering the color characteristics of the light upon said numerals for selectively rendering visible one or another of said sets of numerals and for concurrently rendering one set invisible.

9. In a scale, in combination, a goods support, a weight-indicator having a plurality of sets of indicating numerals, and means operable automatically upon a predetermined load being placed upon the goods support for altering the color character of light upon said numerals whereby the visibility of one set of numerals is obscured and the visibility of the other set is increased.

10. In a scale, in combination, a weight-indicator having a plurality of sets of weight and price indicating numerals, and means controlled by the applied load which is being weighed for selectively controlling the visibility of said sets of numerals whereby certain sets of numerals are displayed for certain weight ranges and other sets for other weight ranges.

11. In a scale, in combination, a goods support, a weight-indicator, having a plurality of sets of indicating numerals thereon, certain sets of said numerals being substantially superimposed upon other sets of said numerals, one of said sets being printed in green and another of said sets being printed in red, means adapted to control the color characteristics of light upon said numerals whereby one or the other of said sets is rendered visible and the set of the opposite color is rendered invisible, and means for controlling the aforesaid means operable automatically when a certain weight upon the goods support is exceeded.

12. In a scale, in combination, an indicating chart and index, means for relatively displacing the same by applied loads, said indicating chart having a plurality of indicating numerals thereon, said numerals comprising common black numerals and colored prefix numerals, and means for rendering the prefix numeral visible or invisible by altering the color characteristics of light whereby the combined result of the prefix numeral and black numeral may be read or the black numerals alone may be read substantially for the purpose described.

13. In a scale, in combination, an indicating chart and index, means for relatively displacing the same by applied loads, said indicating chart having a plurality of indicating numerals thereon, certain common numerals being printed in black, certain prefix numerals being printed in red and green respectively, and means for varying the color characteristics of light whereby under certain light characteristics the black common numerals and the green prefix numerals are visible and the red prefix numerals rendered invisible and whereby under other light characteristics the black common numerals and the red prefix numerals are visible and the green prefix numerals are rendered invisible.

14. A weighing scale comprising in combination with a chart and index means, of means operable by applied loads for relatively displacing the same, said chart comprising a plurality of indicating numerals each formed of common numerals and a colored prefix numeral, each said combined numeral differing in amount from the amount of each common numeral by a fixed amount.

15. A weighing scale comprising in combination with a chart and index means, of means operable by applied loads for relatively displacing the same, said chart comprising a plurality of sets of indicating numerals each set of numerals being formed of a common numeral and a plurality of vari-colored prefix numerals, each complete numeral formed by a common numeral, a prefix of one color differing from the complete numeral formed by the other colored prefix numeral, and the common numeral by a fixed amount.

16. A weighing scale as set forth in claim 14 in which means is provided for selectively controlling the visibility of the colored prefix numeral whereby a combined numeral may be read or the common numeral may be read alone.

17. A weighing scale as set forth in claim 15 in which means is provided for selectively controlling the visibility of the colored prefix numeral whereby a combined numeral may be read or the common numeral may be read alone.

18. In an automatic scale, in combination, a movable chart having successive series of indicating numerals, a load support and means controlled thereby for moving said chart, and means supplemental to the aforesaid chart displacing means and controlled by said load support for automatically selectively controlling the visibility of said series of indicating numerals.

19. A weighing scale comprising in combination, a chart, means comprising a load support and load offsetting means therefor for displacing said chart in accordance with the applied load, said chart having a series of weight-indicating numerals and a second series of weight-indicating numerals substantially coextensive with said first series in the direction of displacement of the chart, and means automatically operable by the operation of the scale itself upon a weighing operation for rendering one series of numerals visible and the other series invisible for a predetermined range of applied loads and for rendering the last mentioned series visible and the first mentioned series invisible for a higher range of applied loads.

20. In a scale, in combination, a goods support, a weight indicator having a plurality of sets of indicating numerals, means for changing the visibility of said sets of numerals to provide alternate visibility of said sets, and means automatically operable by a predetermined load being placed upon the goods support for controlling said first named means to increase the indicating capacity of the scale.

In testimony whereof I hereto affix my signature.

GEORGE W. KEPLER.